United States Patent [19]

Narushima et al.

[11] 4,084,300
[45] Apr. 18, 1978

[54] AUTOMATIC TOOL CHANGING METHOD AND APPARATUS

[75] Inventors: Hiroshi Narushima, Nagoya; Takayosi Hotta, Gifu, both of Japan

[73] Assignee: Okuma Machinery Works, Ltd., Nagoya, Japan

[21] Appl. No.: 721,697

[22] Filed: Sep. 9, 1976

[30] Foreign Application Priority Data

May 8, 1976  Japan .................................. 51-52609

[51] Int. Cl.² .......................................... B23Q 3/157
[52] U.S. Cl. .................................... 29/26 A; 29/568; 408/35
[58] Field of Search ................. 29/26 A, 568; 408/35

[56] References Cited

U.S. PATENT DOCUMENTS

| Re. 26,827 | 3/1970 | Swanson et al. ................ 29/568 X |
| 1,536,730 | 5/1925 | Sears .................... 408/35 X |
| 3,526,033 | 9/1970 | Saunders ................ 29/568 |
| 3,661,050 | 5/1972 | Erikson .................... 29/26 A X |

Primary Examiner—Z. R. Bilinsky
Attorney, Agent, or Firm—Jeffrey M. Greenman

[57] ABSTRACT

New and old tools are changed by loosening or fastening a chuck mounted on a main spindle gripping or releasing the new and old tools and rotating and indexing a tool storage magazine in which a multiplicity of tools are stored, without requiring an exclusively usable driving means.

7 Claims, 8 Drawing Figures

FIG. 5

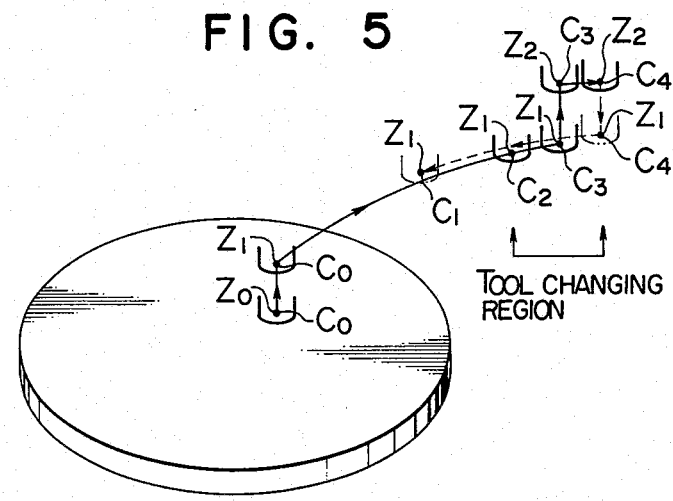

FIG. 6

| | ACTION | SPINDLE HEAD | MAGAZINE | ARM | SLIDER | |
|---|---|---|---|---|---|---|
| $C_2, Z_1 \rightarrow C_3, Z_1$ | FIRST ACTION | TURNING | TURNING | ROTATION | | CHUCK OPEN |
| $C_3, Z_1 \rightarrow C_3, Z_2$ | SECOND ACTION | ELEVATION | | | ELEVATION | TOOL DRAW-OUT |
| $C_3, Z_2 \rightarrow C_4, Z_2$ | THIRD ACTION | TURNING | TURNING ROTATION | | | TOOL INDEXING |
| $C_4, Z_2 \rightarrow C_4, Z_1$ | SECOND ACTION | DESCENT | | | DESCENT | TOOL INSERTING |
| $C_3, Z_1 \rightarrow C_2, Z_1$ | FIRST ACTION | TURNING | TURNING | ROTATION | | CHUCK CLOSED |

AUTOMATIC TOOL CHANGING METHOD AND APPARATUS

This invention relates to an automatic tool changing method and apparatus used in a machine tool wherein a quick-change chuck (hereinafter referred to as a 'chuck') mounted on a main spindle is caused to change tools.

Heretofore, with an automatic tool changing apparatus in general, an exclusively usable driving means is adapted to effect loosening or fastening of a chuck, gripping or releasing of new and old tools, rotating and indexing of a tool storage magazine and the like, so that construction and control means are complicated and the number of parts is large, thus resulting in a very costly apparatus.

Consequently, according to the present invention a columnar support is provided in a tool changing region which is movable in a direction perpendicular to the axial line of the main spindle and parallel to the main spindle. A slider is vertically slidably supported on the columnar support which has mounted thereon a chucking device which is movable up and down to loosen or fasten the chuck. A tool storage magazine in which a multiplicity of tools are stored is journally supported so as to be rotatable about the columnar support in a horizontal plane. The spindle head is moved by a tool changing command in a direction perpendicular to the axial line of the main spindle and thereafter the columnar support is moved by the movement of the spindle head in a direction perpendicular to the axial line of the main spindle. At the time when the axis of main spindle is aligned with the tool changing position of the magazine, and during the movement of the columnar support, the chucking device and the tool storage magazine are engaged with an operating member provided at a stationary part to thereby effect the opening or closing of the chuck and the rotating and indexing of the tool storage magazine.

BRIEF SUMMARY OF THE INVENTION

One object of the present invention is to provide an automatic tool changing apparatus wherein the opening or closing of a chuck mounted on a main spindle, the gripping or releasing of new and old tools and the rotating and indexing of a tool storage magazine in which a multiplicity of tools are stored is accomplished by moving the spindle head or main spindle in two directions, i.e., a direction of the axial line of the main spindle and a direction perpendicular thereto, without requiring an exclusively usable driving means.

Another object of the present invention is that a columnar support is provided in a tool changing region which is movable in a direction perpendicular to the axial line of main spindle and parallel to the main spindle, a slider is vertically slidably supported on the columnar support which has mounted thereon a chucking device for loosening or fastening the chuck by being moved up and down, and a tool storage magazine in which a multiplicity of tools are stored is journally supported so as to be rotatable about the columnar support in a horizontal plane. The spindle head is moved by a tool changing command in a direction perpendicular to the axial line of the main spindle and the columnar support is moved by the movement of the spindle head in a direction perpendicular to the axial line of the main spindle. At the time when the axis of main spindle is aligned with the tool changing position of the tool storage magazine and during the movement of the columnar support, the chucking device and the tool storage magazine are engaged with an operating member provided at a stationary part to thereby effect the loosening or fastening of the chuck and the rotating and indexing of the tool storage magazine, the function of motion required in a body proper of machinery is applied to tool changing, a driving means exclusively usable for the loosening or fastening the chuck and the rotating and indexing the tool storage magazine is dispensed with, the numbers of mechanical parts and electrical control parts are minimized, the cost is reduced, the apparatus is of a lighter and more compact construction, and the occurrences of troubles are minimized and tool changing is reliably effected.

BRIEF DESCRIPTION OF THE DRAWINGS

FIG. 5 shows the operating path of the spindle head at the time of tool changing;

FIG. 6 is a view in explanation of the motions of the spindle head, tool storage magazine, arm and slider of the tool changing region;

DETAILED DESCRIPTION OF THE PREFERRED EMBODIMENT

Description will hereunder be given of one embodiment of the present invention in conjunction with the drawings.

A table 2 for mounting thereon a work W is mounted on the upper surface of a bed 1 so as to be rotatable in a horizontal plane.

Additionally, the bed 1 is provided thereon with a cylindrical column 3 in a manner that the column 3 can be rotated and slid in a vertical direction by driving means (not shown). Solidly secured to the upper portion of the column 3 is a spindle head 5 journally supporting a main spindle 4 having an axis in a vertical direction which performs turning and vertical movement together with the column 3 in accordance with the motion of the column.

Figure 4:
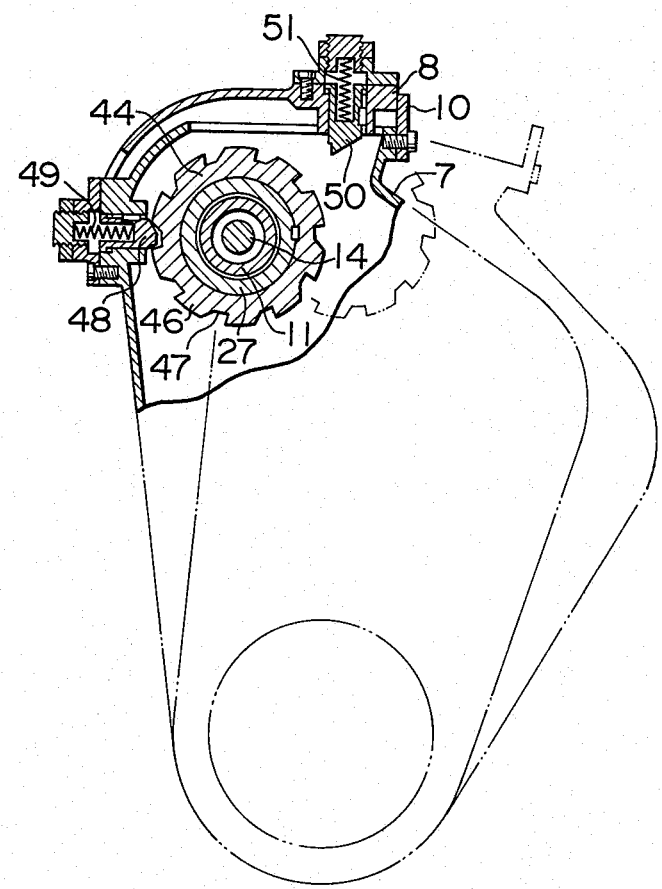
FIG. 4 is a cross-sectional view taken along line IV—IV in FIG. 3.

Inserted into the lower end of the main spindle 4 is a chuck 6 gripping a tool T. An arm 7 journally supported by the body portion of the column 3 so as to be turned about the axis of the column is projecting to a positon away from the table 2 and through which the main spindle 4 is turned by the rotation of the column. A bracket 8 is fixed to the bed 1 in opposed relation to the tip end of the arm. The arm 7 is drawn toward the side where the bracket is mounted, i.e., the side of table by means of a tension spring 9 provided between the arm 7 and the bracket 8. A stopper 10 solidly secured to the arm 7 is stopping at a position wherein it abuts the bracket 8, but it will be turned to the position shown by a two-dot chain line in FIG. 4, being pushed by the spindle head 5 at the time of tool changing. Vertically fixed to said arm 7 is a columnar support 11 provided at the center portion thereof with a through-hole. The axis of columnar support intersects the rotating path of said main spindle 4. Inserted into the through-hole of the columnar support 11 so as to be normally biased upward by means of a spring 15 is a rod 14 provided at the lower end portion thereof with a cam follower 12 and at the upper side surface thereof with a cam 13 constructed and arranged to loosen the chuck 6 by rotating a lever 22 which will be described hereinafter. The cam 13 extends through a slot 16 provided in the columnar support 11 in the axial direction and projects to the outside of the slot 16. Further, a slider 19 having an arm portion 18 provided with a horizontal pin 17 is mounted on the upper outer periphery of the columnar support 11 so as to be slidable up and down. The slider 19 is provided with an annular recessed groove 20 into which an engaging piece 21 solidly secured to the spindle head 5 is coupled at the time when the main spindle is turned to the tool storage magazine portion so that the slider 19 moves up and down in accordance with the vertical movement of the main spindle for the gripping or releasing of new and old tools. The lever 22 is supported at the central portion thereof by the pin 17, and is provided at one end with a cam follower 23 engaging the cam surface of the cam 13 and at the other end with a horse-shoe forked end. Fixed to the inner side of the forked end is a pin 25 which is to be located within an annular recesed groove 24 provided in an outer cylinder of the chuck 6 at the time when the spindle head is turned. Solidly secured to the bracket 8 fixed to said bed 1 is a cam 26 which lowers the rod 14 to operate the lever 22, thereby causing the chuck 6 to be loosened. Further, the body 27 of tool storage magazine is journally supported by the body portion of the columnar support 11. The body 27 of said tool storage magazine is provided at its upper outer periphery with an annular groove 28. In addition, a multiplicity of tool grippers 31 loosening or fastening in a horizontal plane and gripping the tool T are provided at regular intervals on the same periphery centering on the axis of the body of tool storage magazine. The axis of the main spindle and the tool gripping center of the tool grippers are adapted to be aligned with each other at the time when the engaging piece 21 abuts the bottom of the annular groove 20 of the slider 19. The respective tool grippers are adapted to be arranged on the tangent line of the rotating path of the main spindle at the time when said tool grippers are indexed to the tool changing position so that the transfer of tools can be smoothly effected. The tool gripper 31 includes a pair of openable jaws 34, 35 pivotally mounted by means of pins 32, 33. V shaped leaf springs 36 are mounted on the rear surfaces of the openable jaws 34, 35 of the tool grippers and disposed adjacent each other so that the forward ends constituting the gripping portion of the openable jaws are normally closed. A stop pin 37 is fixed to the body 27 of tool storage magazine, and located at the inner side of the forward end portions of the pair of openable jaws so as to control the closing of said pair of openable jaws. A pin 40 having a large diameter portion 38 and a small diameter portion 39 is mounted on the body of magazine in parallel with the columnar support 11 at the inner side of the rear portion of the respective pair of openable jaws in a manner that the pin 40 is biased upward by means of a spring 41. One portion of the large diameter portion is projecting upwardly of the body of tool storage magazine. A disc 42 is mounted on the upper surface of the pin so as to be slidable up and down with respect to the columnar support 11. The pin 40 sinks into the body 27 of tool storage magazine at the time of the rotating and indexing of the body of the magazine because the disc 42 is urged by a pin 43 projecting from the lower portion of the cam 13 due to the descent of the rod 14, resulting in the large diameter portion thereof abutting the inner side of the rear portion of the pair of openable jaws to prevent the ends of the jaws from opening. A ratchet 44 and a gear 45 are solidly secured to the lower portion of the body 27 of the tool storage magazine and arranged vertically. The ratchet 44 is provided with crest portions 46 and root portions 47 alternately at regular intervals with the number of the crest or root portions being equal to the number of the tool grippers. A plunger 48 is linearly movably mounted in the arm 7 in opposed position to the root portion 47, and is urged into the root portion 47 by a spring 49 to thereby determine the rotating and indexing position of the body 27 of tool storage magazine. In FIG. 4, the plunger 48 and the root portion 47 of ratchet are constructed to permit the counterclockwise rotation of the ratchet 44, but prevent the clockwise rotation thereof. A plunger 50 which the ratchet 44 abuts at the time that the arm is turned is provided on the bracket 8, is linearly movable in a horizontal plane substantially perpendicular to the turning direction of the arm, and is biased toward the arm by means of a spring 51.

Additionally, a rotary switch 52 for detecting the rotating and indexing position of the ratchet is fixed to the arm 7, and a shaft 53 of said rotary switch 52 is adapted to be rotated by a gear 54 meshing wih the gear 45.

FIG. 5 shows the course of movement of the spindle head at the time of tool changing. The respective positions of the spindle head are shown as follows: $C_0, Z_0$ — the position of spindle head prior to entering the tool changing phase; $C_0, Z_1$ — the position of spindle head positioned by a tool changing command to a predetermined height; $C_2, Z_1$ — the position of spindle head when the tool changing is to begin or has been completed; $C_3, Z_1$ — the position of spindle head when the chuck is fully loosened; $C_3, Z_2$ — the position of main shaft head retracted upward so as to draw out an old tool; $C_4, Z_2$ — the position of spindle head when a new tool is indexed to the tool changing position; $C_4, Z_1$ — the position of spindle head lowered so as to insert the new tool into the chuck; and $C_1, Z_1$ — the position of spindle head ready for the succeeding work upon the completion of the tool changing work.

Figure 7:
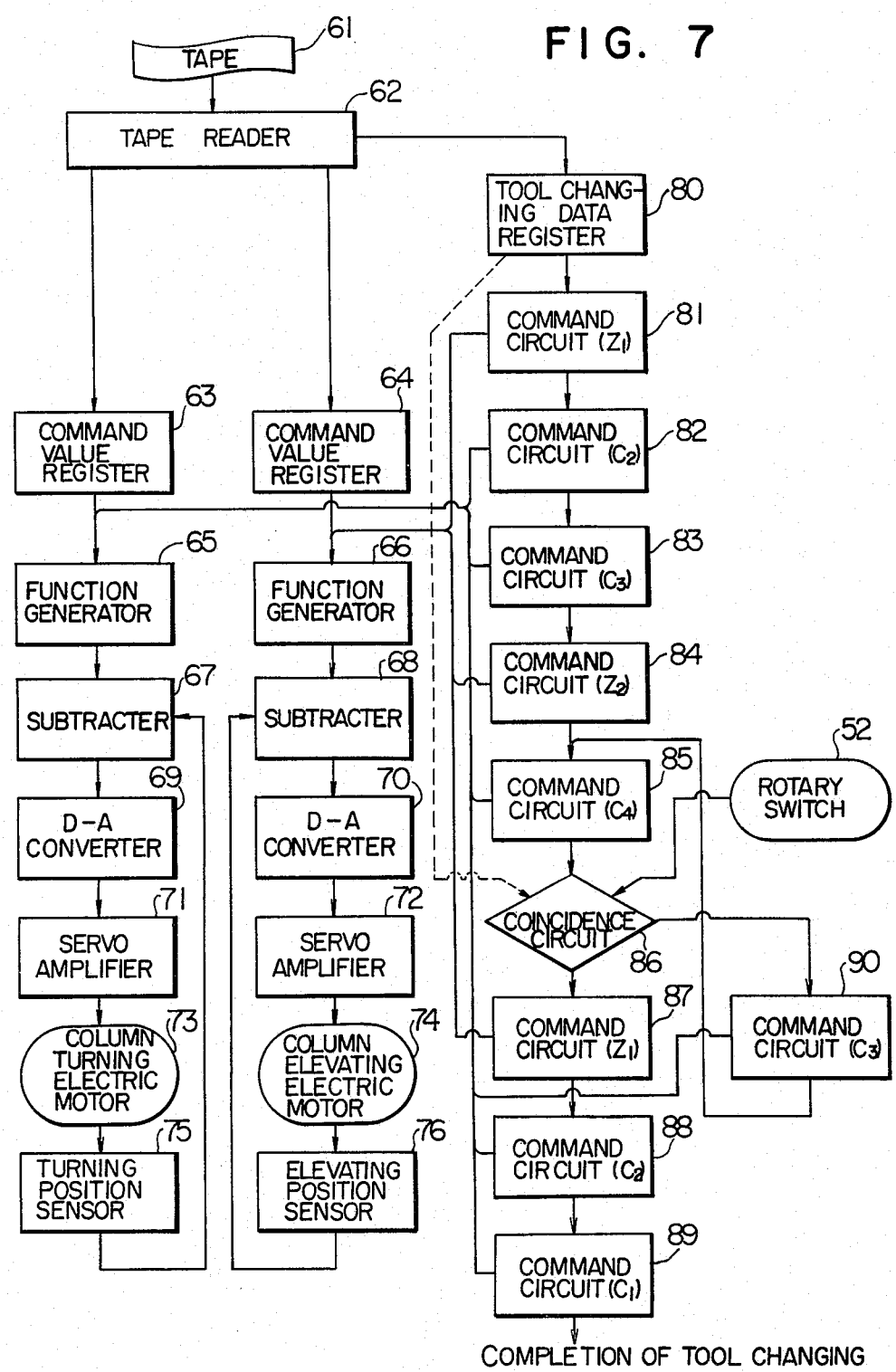
FIG. 7 is a block diagram of a numerical control machine for controlling the movement of a column.

FIG. 7 is a block diagram of a numerical control machine for controlling the movement of a column, wherein data recorded on a tape 61 is read out by a tape reader 62. Column turning command data from among the command data read out are remembered by a command register 63, and column elevating command data are remembered by a command register 64. Upon receiving a column turning command value and a column elevating command value from the command registers 63, 64, respectively, function generators 65, 66 generate instantaneous outputs of the column while turning and elevating, which are sent out to subtracters 67, 68 as instantaneous command values until said command values become values indicating the desired values successively. The subtracters 67, 68 subtract the output values of the column turning position sensor 75 and of a column elevating position sensor 76 from the output values of the function generators 65, 66, respectively, and feed the differences obtained to D − A converters 69, 70. The output converted into analog quantities by the D − A converters, are amplified by servo amplifiers 71, 72 to drive a column turning electric motor 73 and a column elevating electric motor 74. The driving of column varies the outputs of the position sensors 75, 76. Since the function generators 65, 66 continuously produce instantaneous outputs as instantaneous command values, the driving of the column turning electric motor 73 and of the column elevating electric motor 74 is interrupted at the time when the difference obtained by the subtracters 67, 68 becomes zero. Description has been given of the ordinary numerical control without involving the tool changing, so far. Next, description will be given of the numerical control involving the tool changing. Designated as 80 is a tool changing data register which remembers the tool changing data read out by the tape reader 62. Designated as 81, 82, 83, 84, 85, 87, 88, 89 and 90 are command circuits including non-volatile command registers, respectively, and successively feed command values to the function generators 65, 66 in accordance with the movement of tool changing. The movement following thereafter has been described as above. The command circuits 81, 87 are made to remember the command values for positioning the spindle head at the height of $Z_1$, the command circuits 82, 88 to remember the command values for turning and positioning the spindle head at the turning position $C_2$, the command circuits 83, 90 to remember the command values for positioning the spindle head at the turning position $C_3$, the command circuit 84 to remember the command value for positioning the spindle head at the height of $Z_2$, the command circuit 85 to remember the command value for positioning the spindle head at the turning position of $C_4$, and the command circuit 89 to remember the command value for positioning the spindle head at the turning position $C_1$. Designated as 86 is a coincidence circuit which receives a tool command signal sent from the tool changing data register 80 and a tool sensing signal sent from the rotary switch 52, and which causes the command circuit 87 to operate when the two signals coincide, and which causes the command circuit 90 to operate when said two signals do not coincide.

Figure 1:
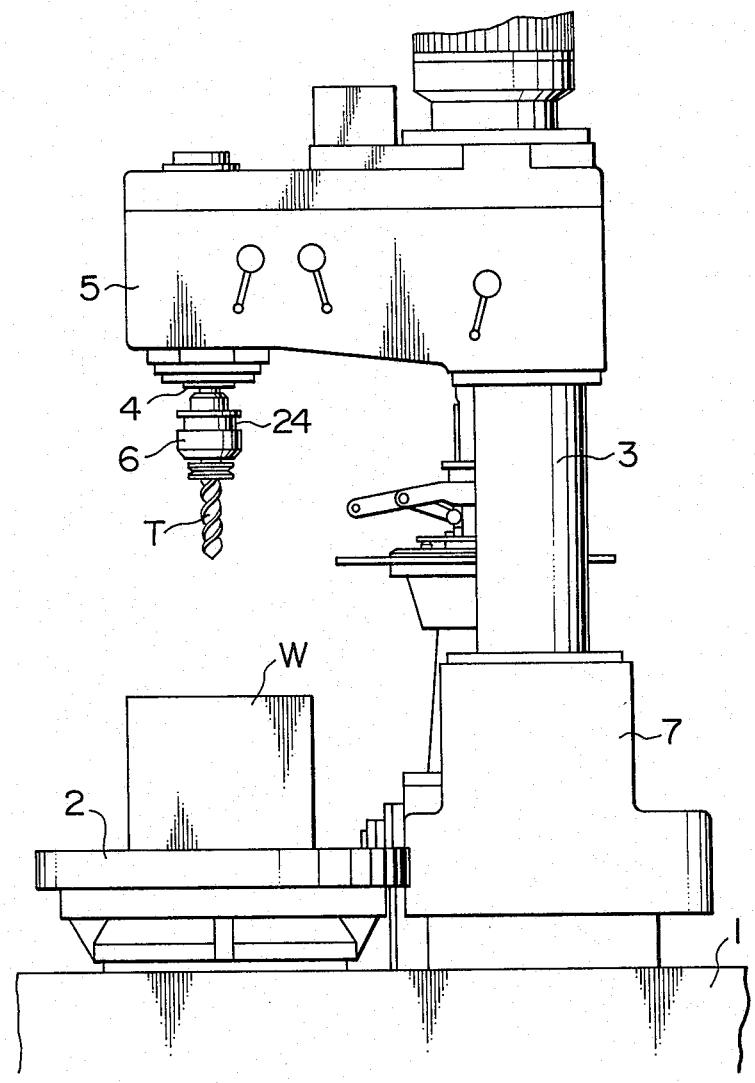
FIG. 1 is a view in front elevation of a drilling machine embodying the present invention.
Figure 2:
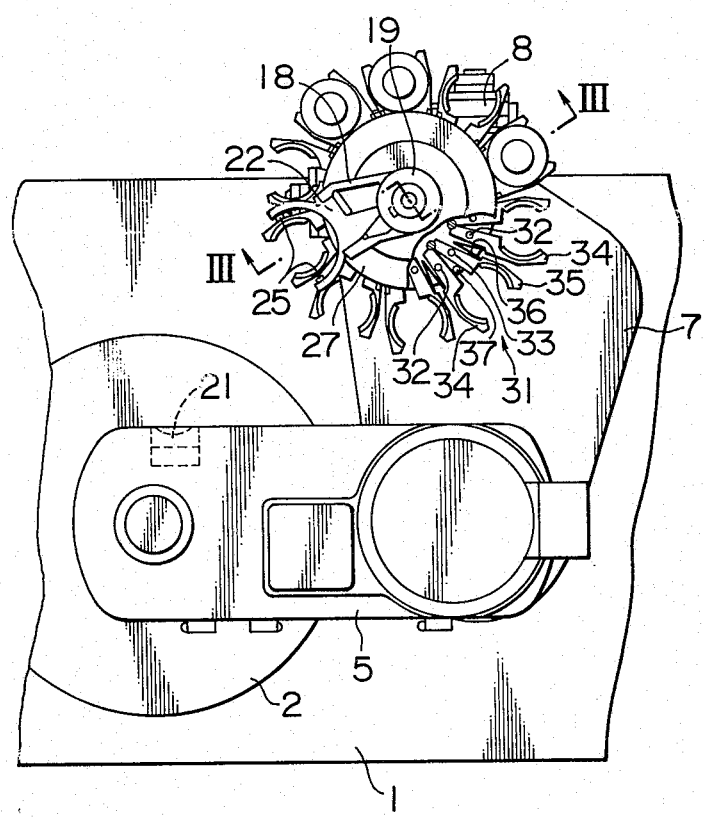
FIG. 2 is a side view thereof.
Figure 3:
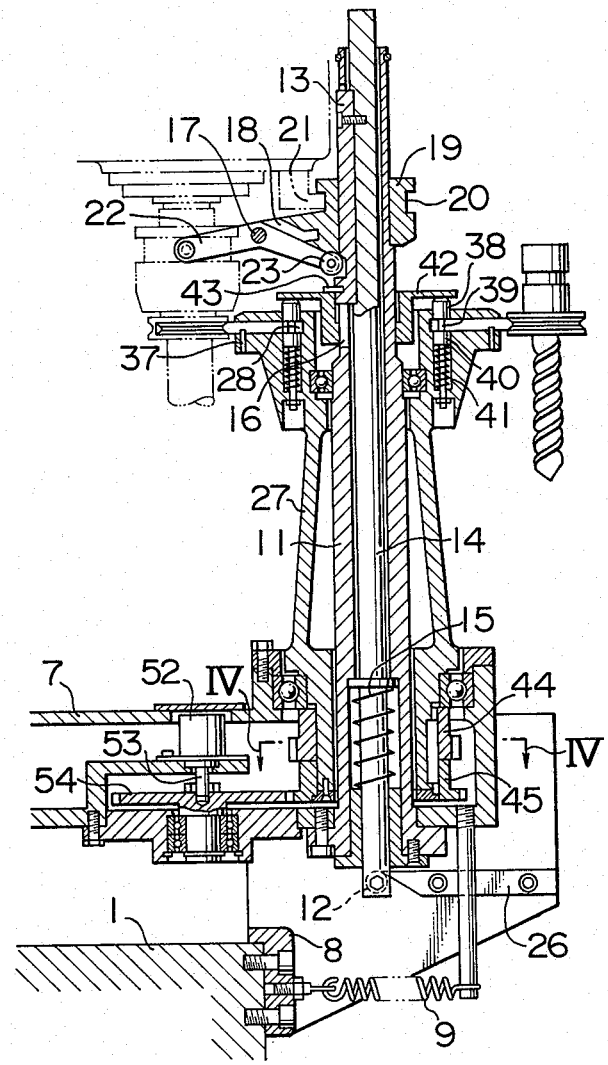
FIG. 3 is a cross-sectional view taken along line III—III in FIG. 2.

Next, description will be given of operation of the embodiment described above. When tool changing commands are read out by the tape reader 62, the tool changing data are remembered by the tool changing data register 80. Thereafter, the desired value of the position $Z_1$ of the main spindle head 5 is sent to the function generator 66 from the command circuit 81 to elevate the column 3 which in turn positions the spindle head at the position $C_0$, $Z_1$. Next, the command circuit 82 is operated to rotate the column 3 which in turn positions the spindle head at the position $C_2$, $Z_1$. In this position, the old tool gripped by the chuck 6 is grasped by the tool gripper 31 of the tool storage magazine by which the old tool had been grasped, and the pin 25 of the lever 22 is located within the annular groove 24 in the outer cylinder of the chuck 6. Additionally, the engaging piece 21 solidly secured to the spindle head is coupled into the annular groove 20 of the slider 19 and abuts the bottom of the groove. Next, the command circuit 83 is operated to rotate the column 3 which in turn positions the spindle head at the position $C_3$, $Z_1$. During this time, the engaging piece 21 of the spindle head pushes the slider 19 downward to thereby rotate the arm 7 clockwise as shown in FIG. 2 through the columnar support 11 against resilient force of the tension spring 9. When the arm is rotated clockwise (i.e., the movement to the right in FIG. 3), the cam follower 12 of the rod 14 is moved along the lower surface of the cam 26 of the bracket 8, and the surface of the cam causes the rod 14 to be lowered. As the rod 14 descends, the cam 13 causes the lever 22 to be rotated clockwise to loosen the chuck 6. When the cam 13 is moved downward, the disc 42 is pushed down by the pin 43, and the pin 40 is forced into the body of tool storage magazine, thereby fastening the tip ends of the tool gripper 31 so as not to be opened. Next, the command circuit 84 is operated to elevate the column which in turn positions the spindle head at the position $C_3$, $Z_2$. During this time, the spindle head is elevated with its engaging piece 21 being engaged with the slider 19. Hence, the chuck 6 is kept loosened, and the old tool is separated from the chuck in this position. Thereafter, the command circuit 85 is operated to rotate the column which in turn positions the spindle head at the position $C_4$, $Z_2$. During this time, the spindle head makes the arm 7 rotate clockwise. While the arm is rotating clockwise, the shoulder of the crest portion 46 of the ratchet 44 mounted at the lower portion of the body 27 of the magazine abuts the plunger 50 of the bracket 8 solidly secured to the bed. Since the arm is continuously rotated the ratchet causes the plunger 48 of the arm to be retracted against the resilient force of the spring 49 and rotated by one pitch counterclockwise in the drawing, thereby indexing a new tool to the tool changing position. During this operation, the gear 54 meshing with the gear 45 of the body 27 of tool storage magazine rotates the shaft 53 of the rotary switch 52, and a signal corresponding to the new tool is sent to the coincidence circuit 86 from the rotary switch. The coincidence circuit receives a tool command signal sent from the tool changing data register 80 and a tool sensing signal sent from the rotary switch, and causes the command circuit 87 to be operated when said two signals coincide. If said two signals do not coincide, the coincidence circuit causes the command circuit 90 to be operated to rotate the column which in turn returns the spindle head to the position $C_3$, $Z_2$. At this time, the arm is retracted together with the spindle head by means of the tension spring 9. During this time, the tool storage magazine maintains the position rotated by one pitch. Thereafter, the command circuit 85 is operated again to rotate the column which in turn positions the spindle head at the position $C_4$, $Z_2$. During this time, the body of tool storage magazine is further rotated by one pitch counterclockwise, and the rotary switch sends an indexed tool sensing signal to the coincidence circuit. Thus, this operation is continued until said two signals coincide. When a coincidence signal is sent out from the coincidence circuit, the command circuit 87 is operated to cause the column to be lowered, which in turn positions the spindle head at the position $C_4$, $Z_1$. This operation causes a new tool to be inserted into the chuck 6. Then, the command circuit 88 is operated to rotate the column which in turn positions the spindle head at the position $C_2$, $Z_1$. At this time, the arm is rotated together with the spindle head counterclockwise by means of the tension spring 9. When the arm is rotated counterclockwise, the cam follower 12 of the rod 14 is moved along the cam surface of the cam 26 to elevate the rod. The chuck 6 is fastened by reversing the aforesaid procedure, a new tool is gripped by the chuck and at the same time the pin 40 is released to thereby unlock the tool gripper. Then, the command circuit 89 is operated to rotate the column which in turn positions the spindle head at the position $C_1$, $Z_1$ and making the spindle head ready for the succeeding work. During this time, the stopper 10 mounted on the arm abuts the bracket 8 and hence the arm 7 cannot rotate together with the spindle head.

Figure 8:
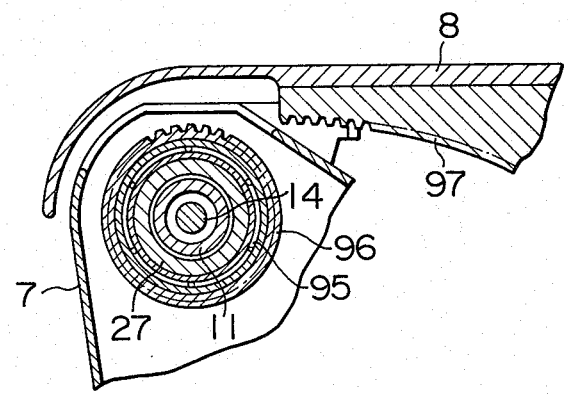
FIG. 8 is a view similar to FIG. 4 showing another embodiment wherein the body of tool storage magazine is rotated.

FIG. 8 shows another embodiment wherein the tool magazine is rotated and indexed. The tool magazine 27 is provided at the lower portion thereof with a one-way rotating clutch 95. A gear 96 is solidly secured to the outer periphery of the clutch 95. An arcuated internal gear 97 centering on the axis of column 3 is fixed to the bracket 8, and the gear 96 and the internal gear 97 mesh with each other. The one-way rotating clutch 95 transmits the rotation of the gear 96 to the magazine when the arm 7 is rotated clockwise, and does not transmit the rotation of the gear 96 to the magazine when the arm is rotated counterclockwise. In this case, the command circuit 85 shown in the block diagram in FIG. 6 may be made to remember the command value for positioning the spindle head at the turning position required so that the arm is rotated to rotate said gear 96, whereby all the tools of the tool storage magazine are rotated and indexed to the tool changing position. Therefore, the command circuit 90 may be eliminated. In this embodiment, a new tool is indexed to the tool changing position while the spindle head is moved from the position $C_3$, $Z_2$ to the position $C_4$, $Z_2$ and hence the tool changing time can be decreased. Operation of the apparatus according to the present embodiment is described as follows: when the command circuit 85 is operated to rotate the arm clockwise, the gear 96 and the magazine become integral with each other by means of the one-way rotating clutch 95, and the magazine is rotated counterclockwise. During this time, tool sensing signals are successively sent to the coincidence circuit 86 from the rotary switch 52. The coincidence circuit receives the tool command signal and the tool sensing signal, and deenergizes the command circuit 85 and energizes the command circuit 87 to operate when said two signals coincide.

In addition, the present invention is applicable to a machine of the type wherein the spindle head is rectilinearly movable in a direction perpendicular to the axial line of the main spindle.

What is claimed is:

1. In a machine tool having an axially extending main spindle, a tool holding chuck supported by said main spindle, said chuck being adapted to releasably hold a tool therein and a tool magazine adapted to hold a plurality of tools, said main spindle and said magazine being movable to a tool changing region an automatic tool changing method comprising the steps of:
   a. moving said main spindle together with said magazine in a direction perpendicular to the axial line of the main spindle and in response to said movement to loosen a chuck of the main spindle in said tool changing region;
   b. elevating said main spindle in the axial direction thereof so as to draw an old tool out of said loosened chuck;
   c. turning further said main spindle together with said magazine and in response to said further turning movement to rotate said magazine for indexing a new tool for receipt into said chuck;
   d. lowering said main spindle in the axial direction thereof so as to insert said new tool into said loosened chuck; and
   e. turning said main spindle together with said magazine in a direction perpendicular to the axial direction of said main spindle and in response to said turning movement to fasten said chuck into gripping engagement with said new tool inserted thereinto.

2. In a machine tool having an axially extending main spindle, a tool holding chuck supported by said main spindle, said chuck being adapted to releasably hold a tool therein and a tool magazine adapted to hold a plurality of tools, said main spindle and said magazine being movable to a tool changing region an automatic tool changing method comprising the steps of:
   a. moving said main spindle together with said magazine in a direction perpendicular to the axial line of said main spindle in said tool changing region;
   b. loosening said chuck positioned on said main spindle in said tool changing region to thereby release said tool contained therein;
   c. moving said main spindle in an axial direction so as to displace a tool positioned within said chuck;
   d. moving said main spindle and said magazine, further in a direction perpendicular to the axial line of said main spindle and in response to said further movement to rotate said magazine for indexing a tool into a position for it to be received in said chuck;
   e. moving said main spindle in an axial direction so as to positon said tool in said chuck; and
   f. tightening said chuck so as to grip said tool.

3. An automatic tool changing apparatus comprising:
   a. a spindle head, an axially extending main spindle supported by said spindle head, said spindle head being adapted to be moved by driving means in the axial direction of the main spindle and in a direction perpendicular to said axis of the main spindle;
   b. a quick-change chuck mounted on said main spindle for gripping a tool;
   c. a magazine storing a plurality of tools, said magazine being movable in a direction perpendicular to the axis of said main spindle in a tool changing region and rotatable about an axis parallel to the axis of the main spindle;
   d. a chucking device supported by said magazine for sliding movement in the direction of the axis of rotation of said magazine; and
   e. a stationary part and an operating member provided at said stationary part, said member actuating said chucking device and rotating and indexing said magazine when said magazine moves together with the spindle head in the same direction in the tool changing region in said direction perpendicular to the axis of the main spindle, whereby tools can be changed as the spindle head moves in said two directions.

4. An automatic tool changing apparatus as set forth in claim 3 wherein said operating member includes a cam and a plunger both of which are provided at the stationary part and further comprising:
   a. a rod vertically movable within said magazine by way of said cam in response to the movement of said spindle head so as to actuate said chucking device; and
   b. a ratchet provided in said magazine and engaging or disengaging said plunger provided at said stationary part to rotate and index said magazine in accordance with the movement of said spindle head.

5. An automatic tool changing apparatus as set forth in claim 3 wherein said operating member includes a cam and an internal gear both of which are provided at said stationary part and further comprising:
   a. a rod vertically movable within said magazine by way of said cam in response to the movement of said spindle head so as to actuate said chucking device; and
   b. a gear and a one way clutch mounting said gear provided within said magazine, said gear meshing with said internal gear provided at said stationary part to rotate and index said magazine in accordance with the movement of said spindle head.

6. An automatic tool changing apparatus comprising:
   a. a spindle head;
   b. an axially extending main spindle supported within said spindle head;
   c. means displacing said spindle head in the axial direction of said main spindle and in a direction perpendicular to the axis of said main spindle;
   d. a quick change chuck mounted on said main spindle constructed and arranged to grip a tool;
   e. a magazine constructed and arranged to store a plurality of tools, said magazine movable in a direction perpendicular to the axis of said main spindle and rotatable about an axis parallel to the axis of said main spindle, said spindle head displacing said magazine as they move together in a tool changing region;
   f. a stationary part including means responsive to said movement for loosening said chuck as said spindle head and said magazine move together in said tool changing region; and
   g. means indexing said magazine about said axis parallel to the axis of said main spindle to present a new tool to said chuck, said indexing means being responsive to said movement of said spindle head and said magazine;
   h. said displacing means displacing said spindle head in an axial direction upon activation of said loosening means to permit withdrawal of an old tool therefrom and displacing said spindle head in the opposite axial direction upon indexing of said magazine to position a new tool therein;
   i. said chuck loosening means constructed and arranged to tighten said chuck upon the separation of said spindle head from said magazine, to thereby tighten said chuck about a tool.

7. The automatic tool changing apparatus in accordance with claim 6 wherein said loosening means comprises:
   a. a cam provided at said stationary part of said apparatus;
   b. a plunger provided at said stationary part of said apparatus;
   c. a rod movable within said magazine by way of said cam in accordance with said movement of said spindle head; and
   d. a chuck engaging means operably connected to said rod and constructed and arranged to loosen said chuck responsive to movement of said rod.

* * * * *